(12) United States Patent
Amondo et al.

(10) Patent No.: US 6,631,959 B1
(45) Date of Patent: Oct. 14, 2003

(54) SAFETY RESTRAINT FOR SCHOOL BUS

(75) Inventors: Alice Y. Amondo, Saugus, CA (US); Bino S. Tanaka, 2615 Manhattan Ave., Montrose, CA (US) 91020

(73) Assignee: Bino S. Tanaka, Montrose, CA (US)

( * ) Notice: Subject to any disclaimer, the term of this patent is extended or adjusted under 35 U.S.C. 154(b) by 249 days.

(21) Appl. No.: 09/136,659

(22) Filed: Aug. 19, 1998

Related U.S. Application Data

(60) Provisional application No. 60/056,614, filed on Aug. 20, 1997.

(51) Int. Cl.[7] .............................................. A47C 31/00
(52) U.S. Cl. ....................... 297/485; 297/474; 224/664; 280/801.1
(58) Field of Search ................................ 297/468, 485, 297/474, 481, 464; 224/275, 663, 664, 576, 580, 585, 162; 2/338; 280/801.1

(56) References Cited

U.S. PATENT DOCUMENTS

| | | | | |
|---|---|---|---|---|
| 2,741,412 A | * | 4/1956 | Hinkle | 297/485 X |
| 4,205,670 A | * | 6/1980 | Owens | 297/464 X |
| 4,515,300 A | * | 5/1985 | Cohen | 224/585 X |
| 4,545,414 A | * | 10/1985 | Baum | 224/664 X |
| 4,637,629 A | * | 1/1987 | Cummings | 297/464 X |
| 4,720,148 A | * | 1/1988 | Anthony et al. | 297/474 |
| 5,294,031 A | * | 3/1994 | Volpei et al. | 224/664 X |
| 5,586,703 A | * | 12/1996 | Radar et al. | 224/601 |
| 5,657,912 A | * | 8/1997 | Nakayama | 224/664 X |
| 5,785,219 A | * | 7/1998 | Kraft | 224/576 |
| 5,897,039 A | * | 4/1999 | Swenke | 224/162 |
| 5,909,927 A | * | 6/1999 | Henshall | 297/468 |

\* cited by examiner

*Primary Examiner*—Peter M. Cuomo
*Assistant Examiner*—Stephen Vu
(74) *Attorney, Agent, or Firm*—John E. Wagner; Robert C. Smith

(57) ABSTRACT

A portable seat belt assembly for school buses and the like which includes a belly pack with a seat belt secured thereto. A student wearing the belly pack approaching a school bus seat opens the belly pack, unwinds the seat belt wrapping it around the back of the seat, turns around, sits down and closes the seat belt buckle assembly. When leaving the bus, the student unbuckles the buckle assembly releasing the belt from the seat, folds the belt back into the belly pack and closes the belly pack. Another embodiment includes a seat belt arrangement carried in the belly pack including a pair of straps each having large hooks with spring clasps for attachment to the seat frame. The student must attach these hooks to the seat frame then sit down and close the buckle assembly. Other embodiments include retractors on the seat belt to assist the student in retrieving the belt after use and a camera case for housing the seat belt.

14 Claims, 6 Drawing Sheets

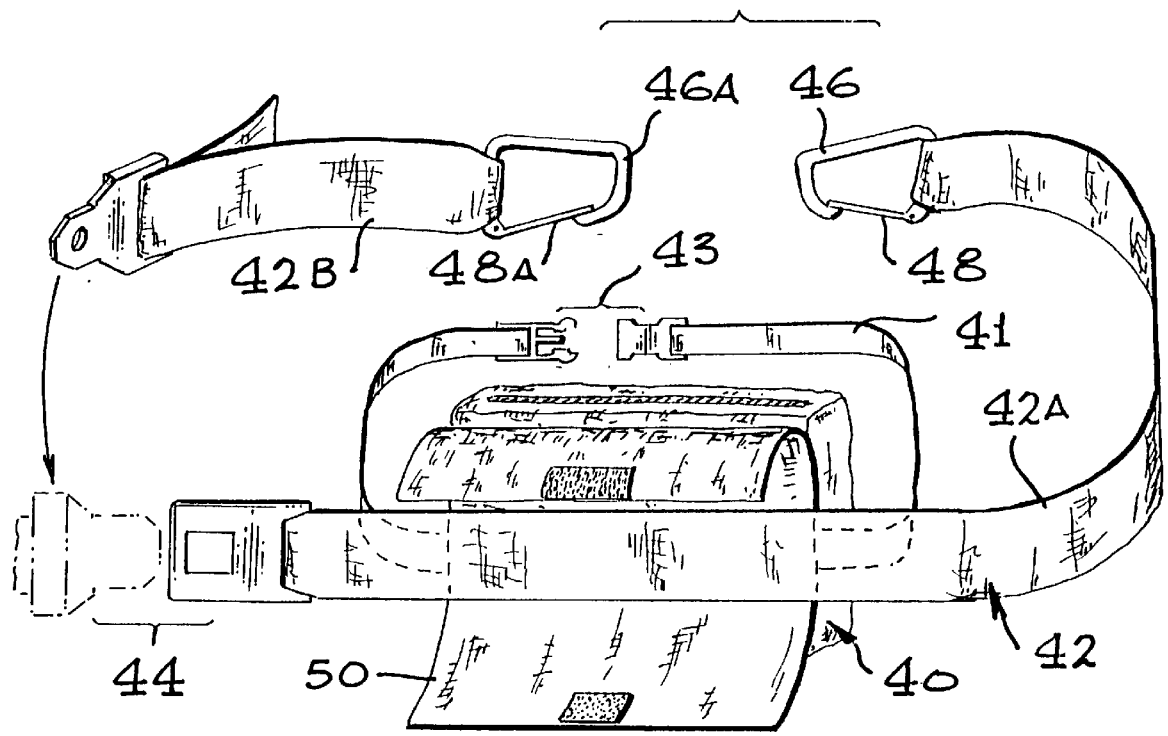
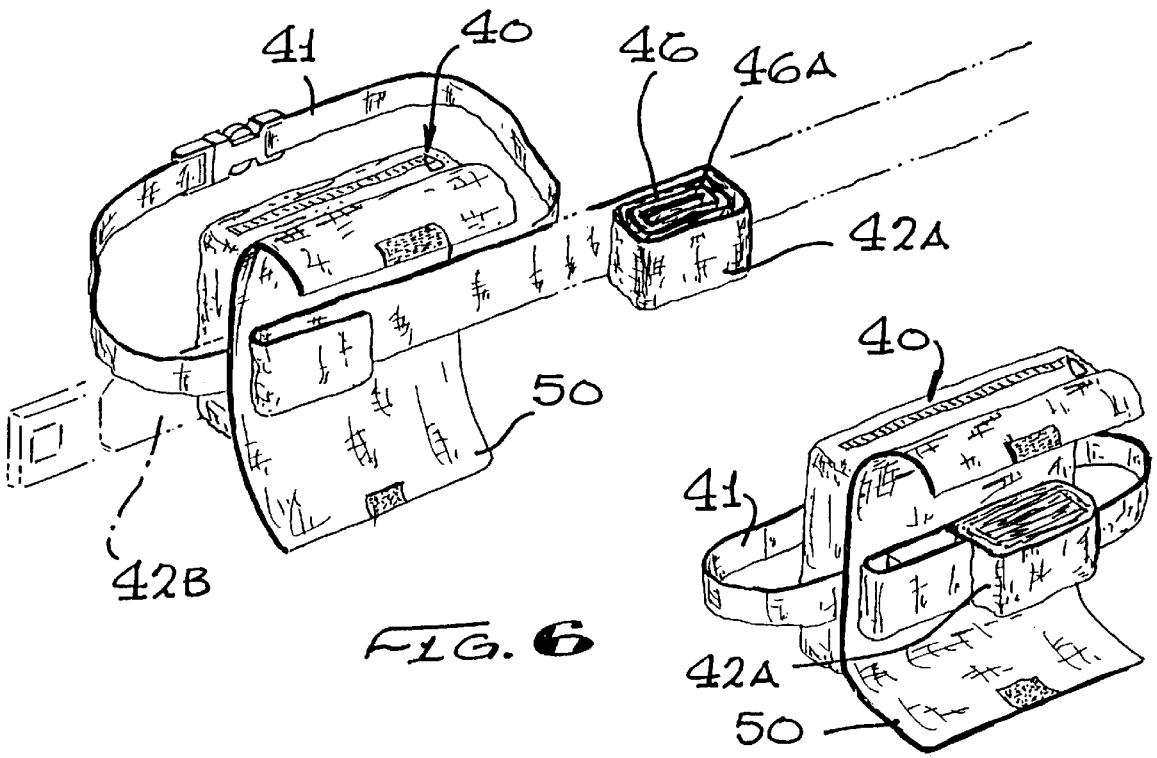

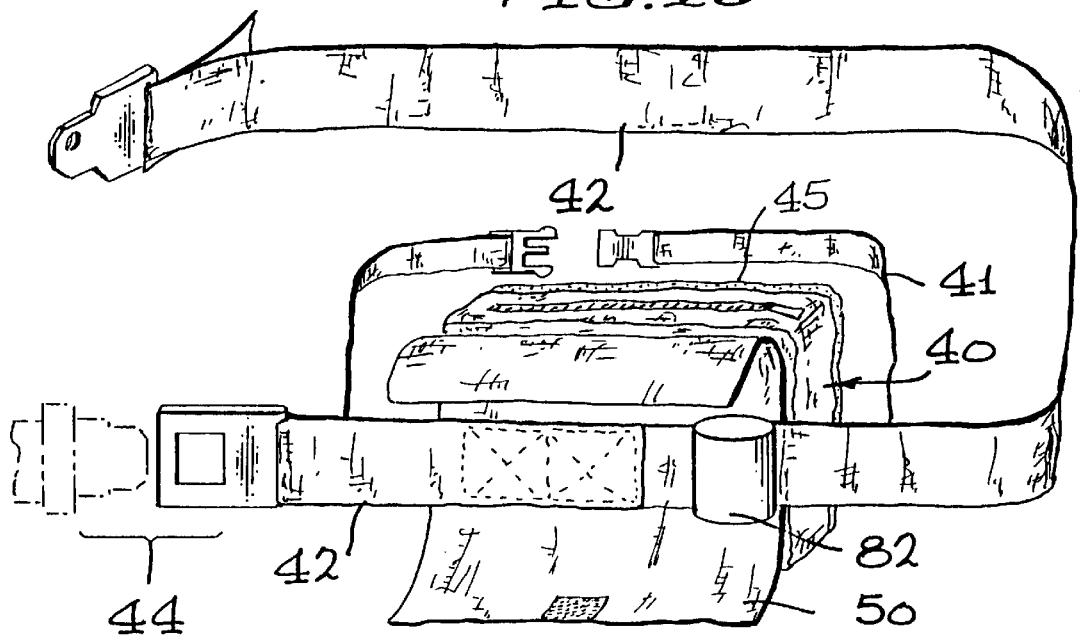
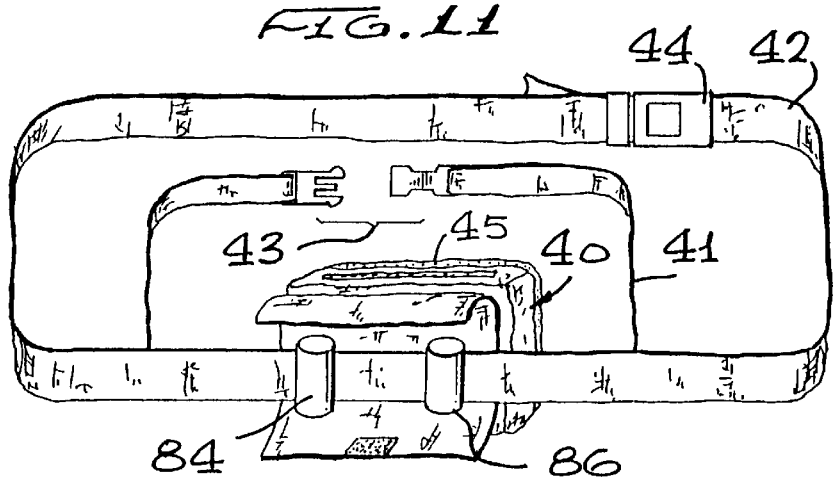
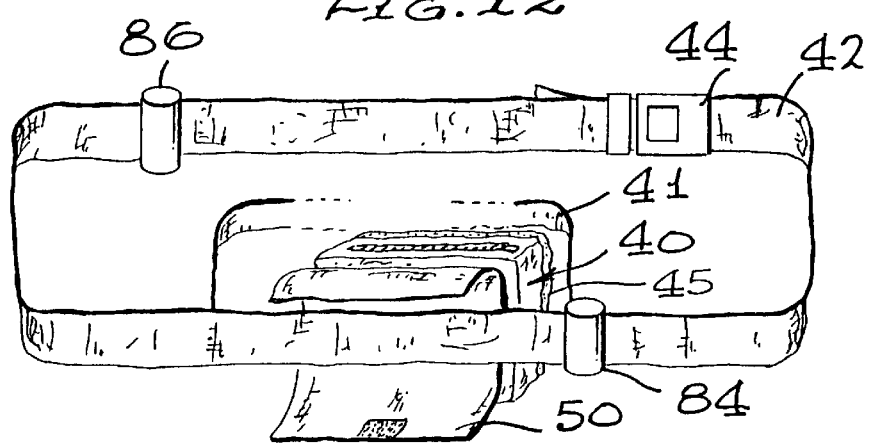

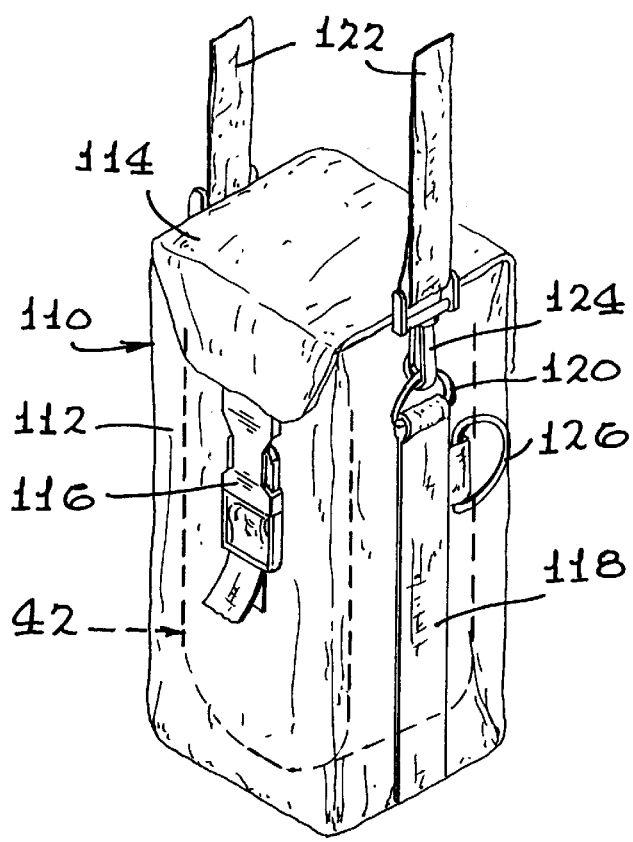
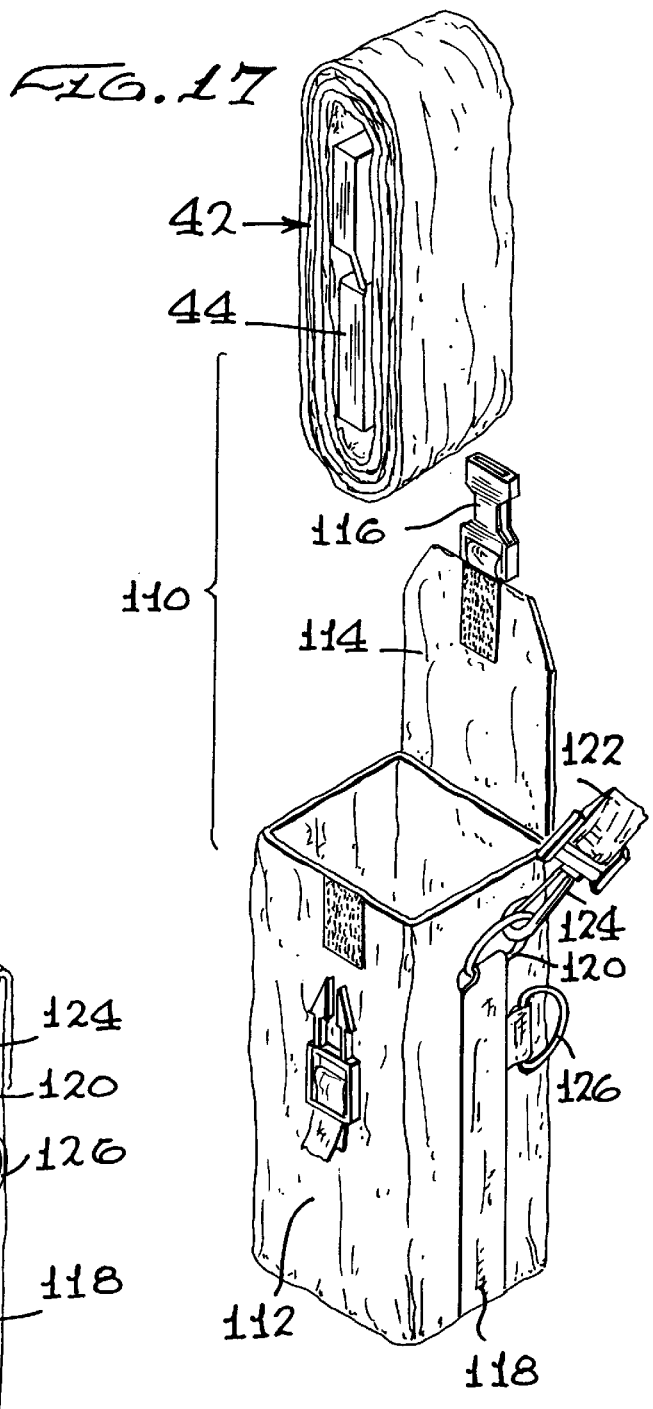

SAFETY RESTRAINT FOR SCHOOL BUS

REFERENCE TO RELATED APPLICATION

This application is a Non Provisional application based upon Provisional Application serial No. 60/056,614 filed on Aug. 20, 1997.

BRIEF DESCRIPTION OF THE INVENTION

This invention relates to vehicle seat belts and more particularly to a portable seat belt which is carried on the person of a rider using public transportation such as school buses.

There have been a significant number of tragic accidents involving school buses, which are not normally equipped with seat belts. It is believed that the extent of injuries or fatalities in such accidents would be significantly reduced if the students carried their own seat belts which they could attach to the seat and remove from the seat at each trip. An obvious difficulty with this is to get the students to attach and use such a seat belt. If it is to be used it must be very quickly and easily attached to the bus seat. The belt must also not be burdensome to carry.

A harness for attachment to school bus seats is shown in U.S. Pat. No. 4,205,670 which was issued in 1980. This patent shows two straps which are fastened around the back of a school bus seat and which have loops through which are fed horizontal straps which buckle around the student. The time required to install such a harness would seem to stand in the way of its wide acceptance.

The inventors have provided seat belt arrangements in which the seat belt is carried in a belly pack of the type in common use among students today. Since many students carry such belly packs, the appearance of the belly pack carrying the seat belts of the invention is little different from many others. When the student arrives at the bus, he or she simply opens the pack, unfolds the belt, opens the buckle if not already open and either passes the belt loop over the back of the seat in one embodiment, or attaches hooks having spring closures on the ends of two belt sections to the legs or other frame parts of the seat, as in a second embodiment. Depending upon the seat configuration, the hooks might be attached to legs of the seat with the seat belt across the student's abdomen. They also could be attached diagonally between an exposed upper seat frame member and a leg or lower support member. Following this simple installation, the student simply sits on the seat and closes the buckle with the belt across his or her abdomen or diagonally across his or her chest if the seat has exposed upper frame members.

Upon arrival, the student opens the buckle to stand up, closes the buckle, lifts the belt over the seat back, wraps the belt around the buckle and places the belt and buckle back in the belly pack which is then closed with any convenient closure such as hook and hoop fasteners, snap fasteners or a zipper. Alternatively, with the second embodiment the student would open the buckle, get up from the seat, close the buckle, and move around the seat as required to unhook the hooks from the seat frame. The student can often unhook both hooks from a sitting position. In either case, the student would then wrap the belt around the buckle and put the buckle, belt and hooks into the belly pack.

Applicants have also devised portable seat belt configurations including a single retractor or pairs of retractors which are carried in a student's belly pack. These belts are pulled out of the pack against the spring force of the retractors and wrapped around the back of the seat, then buckled at the side of the pack as described above. They may be made of lengths for individual seats or for dual size seats. After buckling the belt ends together, the belt end is pulled up to tighten the belt, thereby securing the student to the seat.

Obviously all students will not perform all the steps in the exact order set forth above, but the steps listed are all that is required.

It is believed that the present generation of students, having been accustomed to the use of seat belts and similar restraints since infancy will not find the use of the described arrangement excessively difficult or cumbersome.

BRIEF DESCRIPTION OF THE DRAWINGS

This invention may be more clearly understood with the following detailed description and by reference to the drawings in which:

FIG. 4 is a perspective view of the embodiment of FIG. 2 with the buckle and seat hooks open and ready to install on a seat such as a school bus seat;

FIG. 5 is a perspective view of the embodiments of FIGS. 1 or 2 with the seat belt ready to fold back into the belly pack;

FIG. 6 is a perspective view of the embodiment of FIGS. 1 or 2 with the seat belt folded into the belly pack and the belly pack ready to close;

FIG. 10 is a perspective view of another embodiment of belly pack and seat belt which incorporates a retractor;

FIG. 11 is a perspective view of a further embodiment of belly pack and seat belt incorporating a pair or retractors and with the pack shown in phantom;

FIG. 12 is a perspective view of the embodiment of FIG. 11 with the retractors fully open and the seat belt fully extended;

FIG. 16 is a perspective view of a further embodiment of the invention; and

FIG. 17 is an exploded view of the embodiment of FIG. 16.

DETAILED DESCRIPTION OF THE INVENTION

Figure 1:
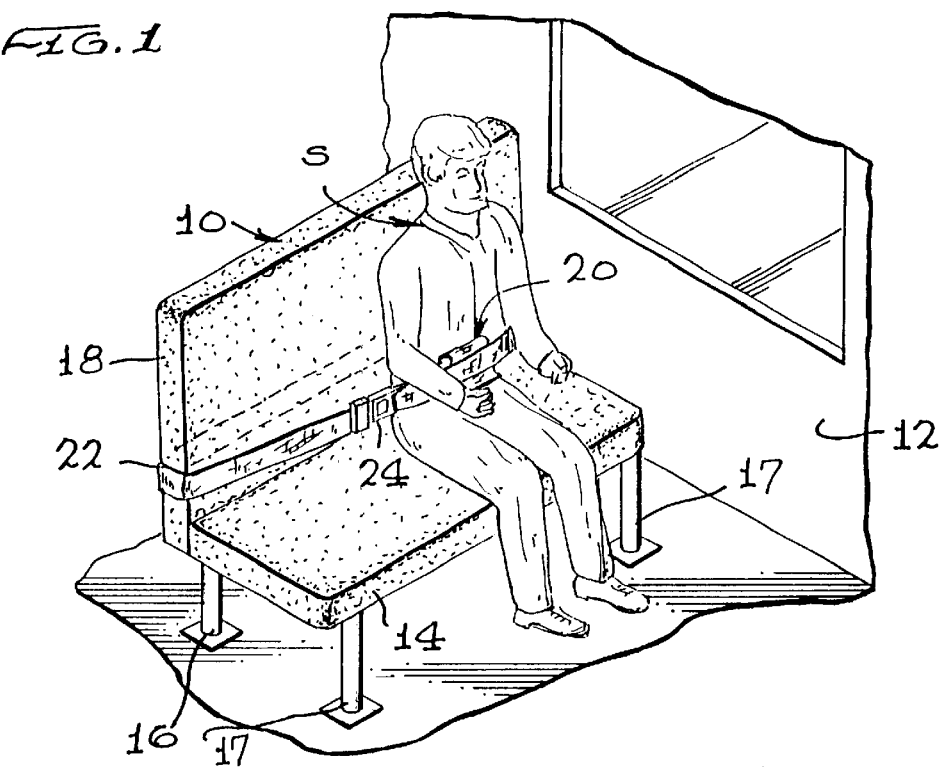
FIG. 1 is a perspective view of a student wearing one embodiment of belly pack and seat belt according to the invention.

FIG. 1 is a perspective view of a student wearing one embodiment of the belly pack and seat belt according to the invention. A student S is shown seated on a seat 10 in a school bus 12. The seat includes a bench part 14, a pair of rear legs 16, front legs 17, and seat back 18. The student S is wearing a belly pack 20 having a waist belt (not shown), the pack having the usual pouch for incidentals and a separate compartment to which is secured a seat belt 22. As shown, the seat belt includes a buckle assembly 24 and the seat belt 22 has been looped over the back of seat 10. Typically the student S would open the compartment of the belly pack 20 having the folded seat belt 22 and loop the belt around the back of the seat while holding the long end of the belt. The shorter end of the belt extends only a short distance from the belly pack 20. The student S then sits down and connects the buckle assembly 24 together. Alternatively, the seat belt may be passed under the bench part of the seat 14 but behind the back seat legs 16. Obviously, this same arrangement can be utilized using a shorter belt for an individual seat.

Figure 2:
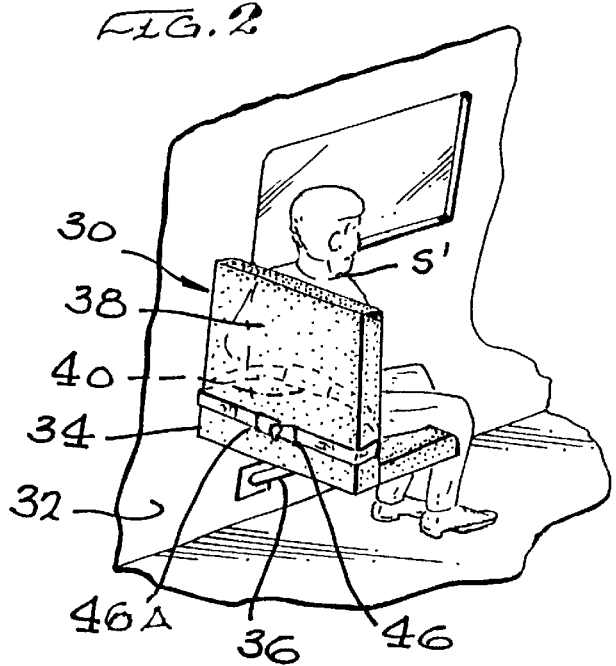
FIG. 2 is a perspective view of a student wearing a second embodiment of belly pack and seat belt incorporating the invention.

A second embodiment of the invention is shown in FIG. 2 which is a perspective view of another student S' sitting on a seat 30 in a bus 32, the seat having a bench part 34 secured to the side of the bus and seat back 38. The bench part 34 is attached to the side of the bus through the use of diagonal braces 36 secured to the bus sidewall 32, so there are no legs, as such. The student S' is wearing a belly pack 40 in which is carried a seat belt 42 which includes two separate sections each of which includes large hooks 46 and 46A, respectively, which the student hooks together. (See FIG. 4) The seat belt 42 is then wrapped around the seat back 38 or, preferably, below the back of the bench part 34. The student S' then sits down and buckles the sections of seat belt 42 together.

Figure 3:
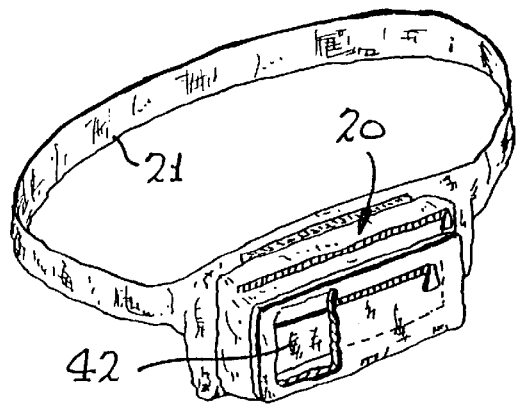
FIG. 3 is a perspective view of either the embodiment of FIG. 1 or FIG. 2 with the belt completely folded into the belly pack.

FIG. 3 is a perspective view of the FIG. 1 embodiment as it would appear with the belt 22 folded into the belly pack 20. In this view is shown the waist belt 21 of belly pack 20. The embodiment of FIG. 2 would look essentially the same except that the compartment for the belt must be large enough to accommodate hooks 46 and 46A.

FIG. 4 is a perspective view of the belly pack seat belt arrangement of FIG. 2 showing details of the separate belt and hook sections. Seat belt part 42A of seat belt 42 is sewn to pack 40. Seat belt part 42A includes the female part of the buckle assembly 44 on one end and on the other end a large hook 46 having a spring closure 48. Seat belt part 42B includes the male part of buckle assembly 44 and a large hook 46A having a spring closure 48A. Also shown is the waist belt 41 for belly pack 40 with clasp 43 and a flap 50 having a hook and loop fastener for securing the seat belt 42 in the belly pack.

The student S' arrives at seat 30 with the belly pack 40 fastened around his waist, so that the clasp 43 of waist belt 41 will be closed. After sitting on the seat, the student S' may attach either hook 46 or hook 46A to one of the rear legs 16 of seat 10 (FIG. 1). Following this he will attach the other hook to the opposite rear leg 16 and will then close the buckle assembly 44. He might in some instances have folded the belt 42 into the pack 40 with the buckle assembly closed. In such case, the belt 42 is simply unfolded and hooks 46 and 46A fastened to the rear seat legs 16.

When it is desired to leave the seat 30, the student S' opens buckle assembly 44, disconnects the hooks 46, 46A from the seat, and rolls the seat belt parts 42A and 42B back into the pouch of pack 40. As shown in FIG. 5, the short part of belt part 42A has been rolled back into the belly pack. Belt part 42A has been rolled toward pack 40 and needs about two more full turns to be placed entirely within the pouch of the belly pack. Belt part 42B is then rolled and placed in the pack 40. When this is done, the flap 50, which typically has a hook and loop type of fastener, is closed as shown in FIG. 6, securing both parts of the seat belt in the belly pack. If the student S can reach the hooks 46, 46A he or she may choose to simply disconnect the hooks, leaving buckle assembly 44 connected and roll the belt parts 42A and 42B into the pack 40.

Figure 7:
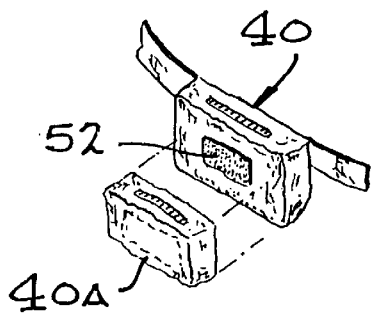
FIG. 7 is a perspective view of another embodiment of the invention.

A modification is shown in FIG. 7 wherein the belly pack 40 includes a separable compartment 40A which is secured to the main pack 40 by means of hook and loop fasteners 52. Other types of fasteners could be used such as snap fasteners.

Figure 8:
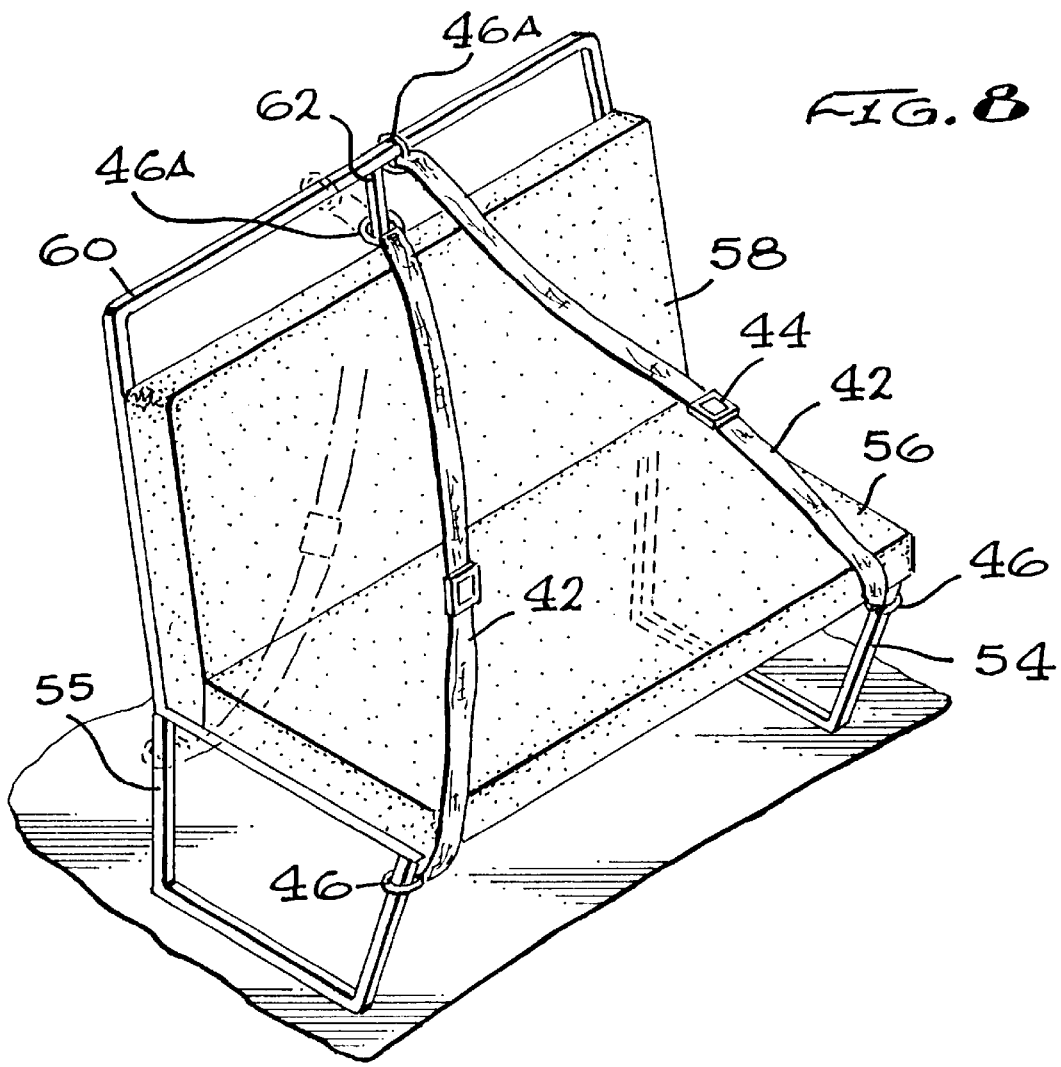
FIG. 8 is a perspective view showing the seat belts of the invention installed on another type of school bus seat.
Figure 9:
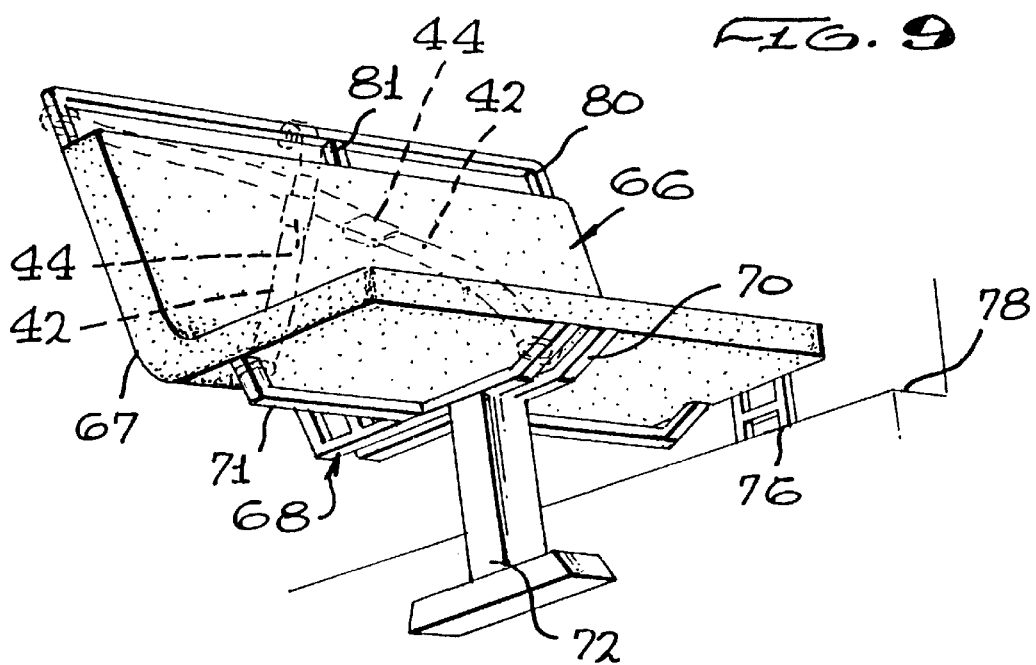
FIG. 9 is a perspective view showing the seat belts of the invention installed on still another type of school bus seat.

Shown in FIGS. 8 and 9 are installations of seat belts according to the invention on school bus seats having different support structures from those described above. The seat shown in FIG. 8 has leg structures 54 and 55 supporting bench 56 and seat back 58 wherein the rear leg portion extends up the back of the seat on both sides becoming an upper frame member 60 extending across the top of the seat back 58. An additional support 62 may extend downwardly from frame member 60 for attachment to another seat frame member in or adjacent to seat back 58. A pair of seat belts 42 of the type shown in FIGS. 4 and 5 having large hooks 46, 46A and buckle assemblies 44 are shown with hooks 46 fastened to the front leg portions of leg structures 54, 55 and hooks 46A secured to upper frame member 60 and to support 62. Preferably, hooks 46A could be fastened directly to support 62. This provides an "across the chest" restraint providing significant protection.

The seat 66 of FIG. 9 is significantly different from those of FIGS. 1, 2 and 8 in that it includes a metal frame 68 having supports 70 attached to its lower side near the center of the seat and which are welded to a single metal post 72 secured to the bus floor. The inside edge of frame 68 is attached by means of an H-shaped support post 76 to a ledge 78 running along an interior sidewall of the bus. The back 67 of seat 66 includes an exposed upper frame member 80. An additional frame member 81 may extend between frame member 80 and a support running along the back of seat 66 or to the back of supports 70. With this seat design there may not be sufficient clearance between H-shaped post 76 and the bus sidewall to attach hooks 46, 46A. In such case, hooks 46 may be attached to supports 70 and hooks 46A to upper frame members 80 and/or 81. Alternatively, hooks 46 could be attached to the outside ends of underseat brace 71 which are secured to support 70. The inside end of brace 71 may not be accessible because seat back 67 is too close to the bus sidewall, in which case belt 42 used by a student in the seat nearest the bus sidewall would be hooked between support 70 and upper frame member 80.

FIG. 10 is a perspective view of a belly pack and seat belt according to the invention in which a belt retractor is incorporated. In this embodiment, a belt pack 40 includes waist belt 41 the ends of which are secured together around the waist of a student by means of clasp 43. A flap 50 having hook and loop fasteners 52 secures seat belt 42 in the belly pack 40. Belt 42 is stitched to the pack 40 and includes male and female ends of a buckle assembly 44. A single retractor 82 is secured into the pack and includes a spring for winding the extended end of belt 42 back into itself. The female end of buckle assembly 44 is preferably folded back into the pack 40 as shown in FIG. 5, for storing.

Use of the belt of FIG. 10 is essentially as described for the embodiment of FIG. 1. After opening the flap 50, the student pulls the belt 42 out of the retractor 82 as required to go around the back of the bus seat or under the seat and behind the back legs if this arrangement is available. The student, while holding the belt end, then turns around, sits on the seat, closes the buckle assembly 44, and pulls the free end of belt 42 such that it is tight. When he or she is ready to leave the bus, the buckle assembly 44 is released, allowing the extended end of belt 42 to be rewound into the retractor 82. The shorter end of belt 42 with part of buckle assembly 44 is folded into the pack as shown in FIG. 5.

FIG. 11 is a perspective view of another embodiment of seat belt/belly pack arrangement with the belt and pack incorporating a pair of retractors. In this embodiment, the belt 42 is stitched into the pack 40 and includes waist belt 41 and clasp 43 as described above. Much of the length of belt 42 is wound on two separate retractors 84 and 86 which are generally not secured to the pack 40. The ends of belt 42 are shown connected at buckle assembly 44.

FIG. 12 is a perspective view of the embodiment of FIG. 11 with the belt 42 almost fully extended, as it might be if it were wrapped around the back of a two-person bench seat such as that shown at numeral 10 (FIG. 1). Slightly less than half the length of belt 42 is carried on each of retractors 84 and 86 which move outward of the pack as belt 42 is extended. Retractors 84 and 86 are each substantially smaller and lighter than retractor 82 and may be preferred for this reason. Either the FIG. 10 or FIGS. 11 and 12 embodiments would appear as in FIG. 3 when not in use. Because of the additional weight of the retractors 82, 84 and 86 it is desirable to incorporate some additional padding 45 on the rear sides of belly pack 40 under the retractors.

Figure 13:
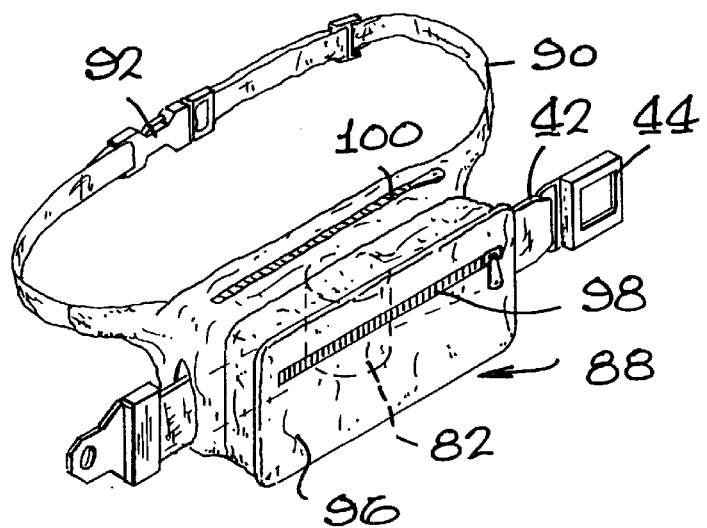
FIG. 13 is a perspective view of still another embodiment of belly pack and seat belt incorporating a retractor.
Figure 14:
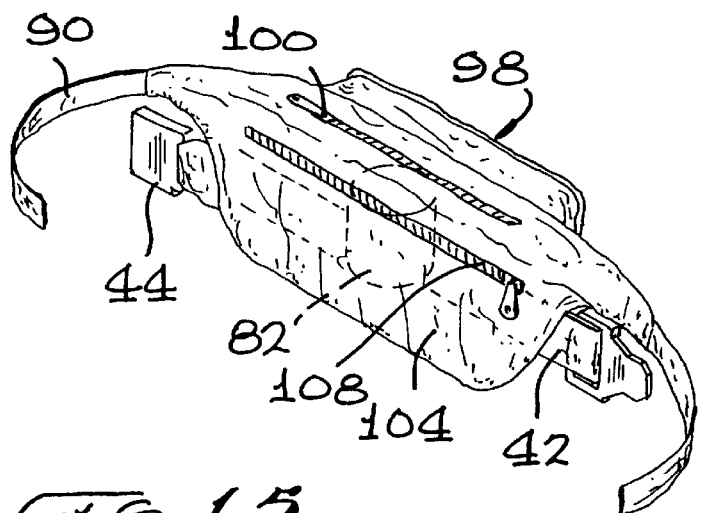
FIG. 14 is a rear perspective view of the embodiment of FIG. 13.
Figure 15:
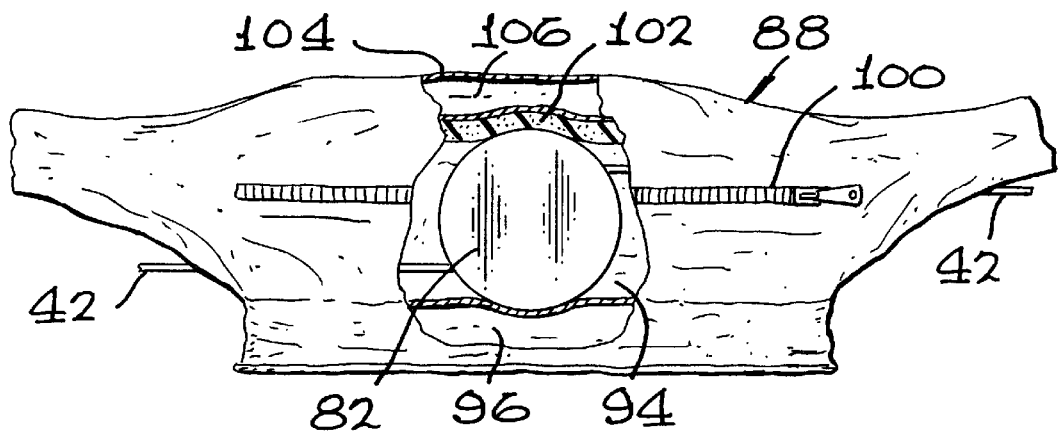
FIG. 15 is a top view, partly in section, of the embodiment of FIGS. 13 and 14.

A somewhat different embodiment is shown in FIGS. 13, 14 and 15. In this embodiment, a belly pack 88 is shown including a waist belt 90 having a clasp 92, a seat belt 42 with a buckle assembly 44 and a retractor 82 secured in a separate chamber 94 (See FIG. 15) within pack 88. At the front of pack 88 is a compartment 96 for carrying incidentals and which is closed with a zipper fastener 98. Inertia type retractor 82 is secured in chamber 94 accessed by a separate zipper 100. Because of the weight and hardness of retractor 82, a layer of padding 102 is placed in the back wall of chamber 94 or the wall closest to the wearer. This padding could also be placed on the exterior wall 104 of pack 88, the object simply being to minimize the feeling on the part of the wearer of a hard pressure point at a concentrated position along the wall of pack 88. An additional chamber 106 may be placed between chamber 94 and exterior inside wall 104. This chamber may be accessed by means of a zipper 108. With this embodiment, the wearer, who will already be wearing pack 88 with waist belt 90 secured, will pull the end of belt 42 having the male end of buckle assembly 44 to whatever length is required to go around the seat back such as seat 30 of FIG. 2, place the belt around the seat back, sit on the seat and fasten the buckle assembly 44 together, leaving the wearer between the seat and seat belt 42.

A further embodiment is shown on FIGS. 16 and 17 wherein a rolled-up seat belt 42 is carried in a typical camera case of the type which is used to carry many types of 35-mm cameras. Such cases are carried by large numbers of people and certainly are seen so frequently that they give little reason for special remarks or comments. Thus, it is believed that students will have little objection to carrying a seatbelt in such a camera case. FIG. 16 is a perspective view of a camera case 110 including a pouch 112 having a top closure flap 114 and a closure strap with a clasp 116. A section of web belt 118 is secured to opposite sides of pouch 112 each of which terminate in a D-ring 120. Only one such belt 118 and D-ring 120 are visible in FIGS. 16 and 17. A separate carry strap 122 includes on each end a hook 124 having a spring closure for engagement with D-rings 120. A separate pair of D-rings 126 are secured to the sides of pouch 112 which may be fastened to a waist belt (not shown), if desired. FIG. 17 shows pouch 112 with flap 114 open and with the rolled-up seat belt 42 pulled out of pouch 112. With this embodiment, the student simply unrolls the seat belt, wraps it around the back of the seat, sits down and fastens the buckle assembly 44 in front of him.

A number of modifications will be apparent to those skilled in the art. While the embodiments have been described in connection with a belly pack having a pouch for the usual articles carried in such packs plus a pouch for the seat belt, the belly pack could be made with just a pouch for the seat belt. The seat belt pouch is preferably open at the sides so that the belt parts can be rolled in and out as discussed above. Also, it is preferable that the belt, or part of it as in FIG. 4, be stitched to the belly pack, although it is apparent that the belt, if separate, can be rolled separately and then placed in a pouch of a belly pack. Other means of closing the pouch such as snap fasteners may be employed. For any of the described embodiments, an aircraft-type quick release buckle could be used in place of buckle assembly 44.

The above-described embodiments of the present invention are merely descriptive of its principles and are not to be considered limiting. The scope of the present invention instead shall be determined from the scope of the following claims including their equivalents.

What is claimed is:

1. A portable seat belt assembly for attachment to a seat of a school bus comprising:
   a pouch and means for attaching said pouch to an individual;
   a seat belt including a buckle assembly having male and female parts, said seat belt and buckle assembly being carried in said pouch when not attached to said seat; and
   further comprising means for attaching said seat belt to said seat including a single strap secured to said pouch having opposite ends secured to the male and female parts of said buckle assembly whereby said strap may be passed over the back of said seat with said individual located between said pouch and said seat.

2. The portable seat belt assembly as claimed in claim 1 wherein a retractor is secured to said strap.

3. The portable seat belt assembly as claimed in claim 2 wherein said retractor also is secured to said pouch.

4. The portable seat belt assembly as claimed in claim 1 wherein a plurality of retractors are secured to said strap.

5. The portable seat belt assembly as claimed in claim 1 wherein said single strap is stitched to said belly pack and the ends of said strap with separate parts of said buckle assembly are folded into said belly pack when not attached to said seat.

6. A portable seat belt assembly for attachment to a seat of a school bus comprising:
   a belly pack including a pouch and strap means for securing said belly pack around the waist of an individual;
   a seat belt secured to said belly pack including a buckle having male and female parts on opposite ends of said belt and retractor means, a portion of said seat belt being stored in said retractor means, said seat belt and said retractor means being carried in said belly pack when seat belt is not attached to said seat.

7. The portable seat belt assembly as claimed in claim 6 wherein said retractor means is secured to said belly pack.

8. The portable seat belt assembly as claimed in claim 6 wherein said retractor means includes a plurality of retractors secured to said seat belt.

9. A portable seat belt assembly for attachment to a seat of a school bus comprising:

a belly pack including a pouch and strap means for securing said belly pack around the waist of an individual;

a seat belt including a buckle assembly having male and female parts, said seat belt being carried in said belly pack when not attached to said seat; and further comprising means for attaching said seat belt to said seat including a single strap secured to said belly pack having opposite ends secured to the male and female portions of said buckle assembly whereby said strap may be passed over the back of said seat with said individual located between said belly pack and said seat.

10. A portable seat belt assembly for attachment to a seat of a school bus comprising:

a belly pack including a pouch and strap means for securing said belly pack around the waist of an individual;

a seat belt including a buckle assembly having male and female parts, said seat belt being carried in said belly pack when not attached to said seat; and wherein a retractor is secured to said strap.

11. The portable seat belt assembly as claimed in claim 10 wherein said retractor also is secured to said belly pack.

12. A portable seat belt assembly for attachment to a seat of a school bus comprising:

a pouch and strap means for carrying said pouch;

a seat belt including a single strap with a buckle assembly having male and female parts secured to said strap, said seat belt and buckle assembly being carried in said pouch when not attached to said seat and separable from said pouch when attached to said seat.

13. The portable seat belt assembly as claimed in claim 12 wherein said pouch includes storage means dimensioned to contain said seat belt assembly.

14. The portable seat belt as claimed in claim 13 including means for attaching said pouch to a wearer.

* * * * *